United States Patent
Christian et al.

(10) Patent No.: US 11,237,559 B2
(45) Date of Patent: Feb. 1, 2022

(54) METHODS AND APPARATUS FOR RADIO STATION MONITORING USING UNMANNED AERIAL VEHICLES

(71) Applicant: The Nielsen Company (US), LLC, New York, NY (US)

(72) Inventors: Timothy Christian, Palm Harbor, FL (US); Mohammed Sayed, Santa Clara, CA (US); Gloria Bautista, Pembroke Pines, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 369 days.

(21) Appl. No.: 16/360,982

(22) Filed: Mar. 21, 2019

(65) Prior Publication Data

US 2020/0301425 A1    Sep. 24, 2020

(51) Int. Cl.
| | | |
|---|---|---|
| B64C 39/02 | (2006.01) | |
| G05D 1/00 | (2006.01) | |
| G05D 1/10 | (2006.01) | |
| H04B 17/10 | (2015.01) | |

(52) U.S. Cl.
CPC ......... *G05D 1/0094* (2013.01); *G05D 1/0022* (2013.01); *G05D 1/101* (2013.01); *H04B 17/104* (2015.01)

(58) Field of Classification Search
CPC .... G05D 1/0094; G05D 1/101; G05D 1/0022; H04B 17/104; B64C 39/024; B64C 2201/12; G08C 17/02
See application file for complete search history.

(56) References Cited

U.S. PATENT DOCUMENTS

| | | | |
|---|---|---|---|
| 5,945,932 A | 8/1999 | Smith et al. | |
| 7,340,076 B2 | 3/2008 | Stach et al. | |
| 8,493,902 B2 | 7/2013 | Suri et al. | |
| 8,661,463 B2 | 2/2014 | Lee et al. | |
| 9,387,928 B1 * | 7/2016 | Gentry | G08G 5/0052 |
| 9,733,644 B2 * | 8/2017 | Levien | A63H 27/12 |
| 9,826,256 B2 | 11/2017 | Sham | |
| 10,097,862 B2 | 10/2018 | Sham | |
| 10,810,885 B2 * | 10/2020 | Kim | H04W 52/325 |
| 2016/0021435 A1 * | 1/2016 | Topchy | G08C 23/02 |
| 2016/0309337 A1 * | 10/2016 | Priest | H04W 16/18 |
| 2017/0090484 A1 * | 3/2017 | Obaidi | B64D 47/08 |
| 2017/0346853 A1 | 11/2017 | Wyatt et al. | |
| 2018/0004207 A1 * | 1/2018 | Michini | G08G 5/0069 |
| 2018/0165504 A1 | 6/2018 | Kerzner et al. | |
| 2018/0292844 A1 * | 10/2018 | Kosseifi | B60L 53/51 |
| 2020/0045353 A1 * | 2/2020 | Hennacy | H04N 21/23424 |

* cited by examiner

*Primary Examiner* — Donald J Wallace
*Assistant Examiner* — Daniel M. Robert
(74) *Attorney, Agent, or Firm* — Hanley, Flight & Zimmerman, LLC

(57) ABSTRACT

Methods, apparatus, and systems are disclosed for performing radio station monitoring using unmanned aerial vehicles. An example unmanned aerial vehicle disclosed herein includes a radio receiver to receive a radio broadcast from at least one radio station, a watermark detector to detect a watermark in the received radio broadcast, and a communication transceiver to report at least one of a detected watermark or information associated with the detected watermark to a remote receiver.

17 Claims, 11 Drawing Sheets

METHODS AND APPARATUS FOR RADIO STATION MONITORING USING UNMANNED AERIAL VEHICLES

FIELD OF THE DISCLOSURE

This disclosure relates generally to radio station monitoring, and, more particularly, to methods and apparatus for radio station monitoring using unmanned aerial vehicles.

BACKGROUND

The proliferation of radio channels delivering various forms of content to the pubic engages millions of listeners worldwide. Monitoring the media (e.g., programming content, commercials, etc.) being aired is of interest to content owners, copyright holders, distributors, broadcasters, etc. Watermarking media (e.g., audio watermarking) enables the identification of media such as radio broadcasts and radio advertisements and can be used to identify the station or channel to which a receiver is tuned. Watermarking techniques include embedding one or more codes into an audio component of the media to convey media identifying information. Extraction and decoding of the watermark permits the mapping of the watermark to media identifying information. The ability to gather the data contained in the watermark allows content owners and copyright holders to, for example, evaluate the true reach of media assets, confirm and prove content broadcast and usage, communicate content rights and intent, identify potential misappropriations of assets, etc.

DETAILED DESCRIPTION

Figure 1:
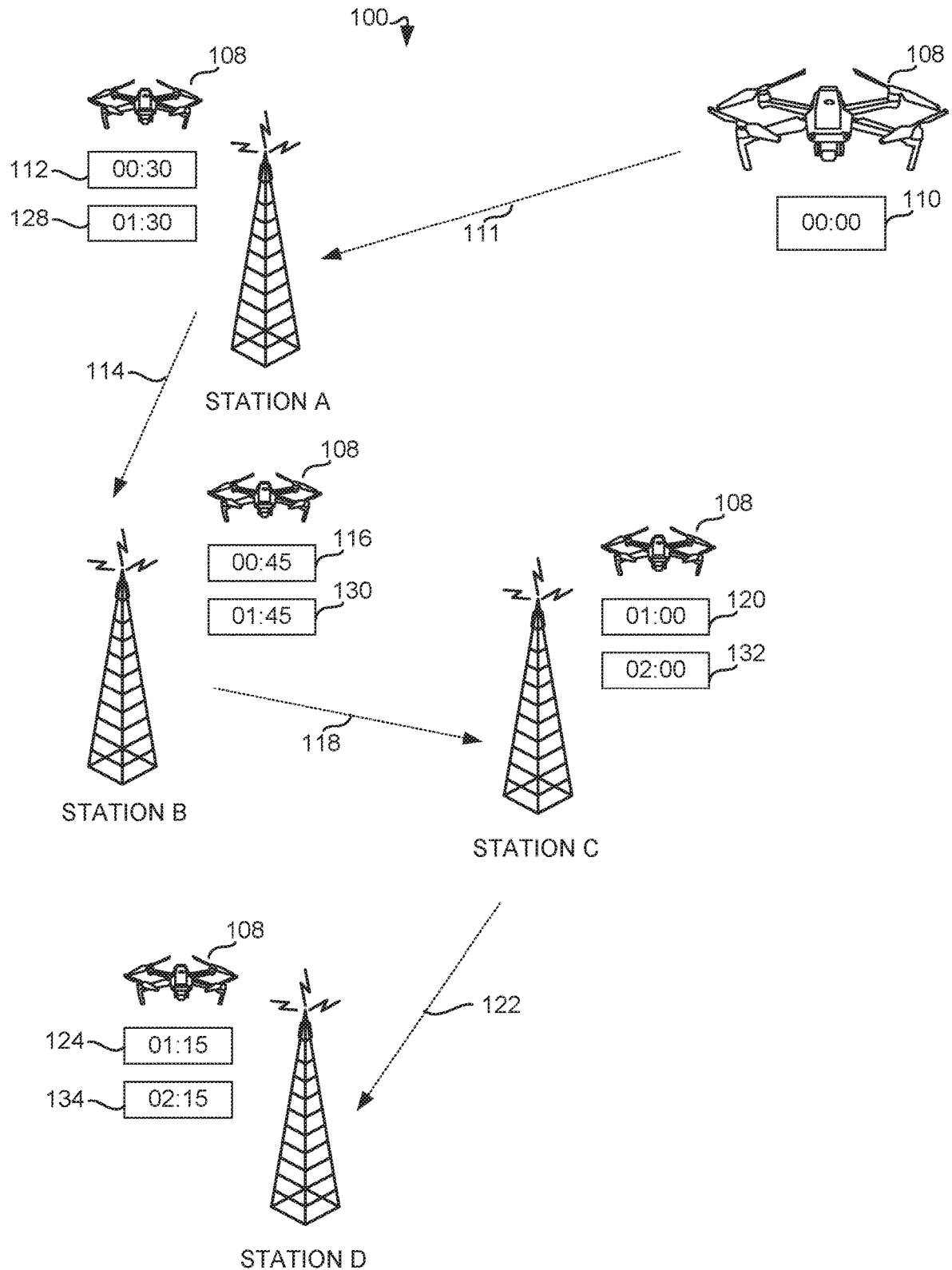
FIG. 1 is an illustration of an example use of unmanned aerial vehicle(s) for purposes of monitoring multiple radio stations according to a schedule.

Methods, apparatus, and systems to monitor radio stations using unmanned aerial vehicle watermark monitors are disclosed. Example apparatus to perform radio station monitoring using an unmanned aerial vehicle disclosed herein includes a radio receiver to receive a radio broadcast from at least one radio station, a watermark detector to detect a watermark in the received radio broadcast, and a communication transceiver to report at least one of a detected watermark or information associated with the detected watermark to a remote receiver.

These and other example methods, apparatus, and systems to monitor radio stations using unmanned aerial vehicle watermark monitors are disclosed in further detail below. As used herein, the term "media" refers to content and/or advertisements. Furthermore, as used herein, the term "media" includes any type of content and/or advertisement delivered via radio broadcasting. Media watermarking, such as audio watermarks, allows for the identification of media, such as radio broadcasts and advertisements, to identify the station or channel to which a receiver is tuned. Media watermarking consists of embedding one or more codes (e.g., one or more watermarks) conveying media identifying info on and/or an identifier that may be mapped to media identifying information. An audio watermark may be embedded at a broadcast facility and carry digital data in the form of symbols. In some examples, the audio component is selected to have a signal characteristic sufficient to hide the watermark and the information is embedded into the signal in a way that is difficult to remove. As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose, such as tuning (e.g., a packet identifying header), copyright protection, etc. In some examples, to identify watermarked media, the watermark(s) are extracted and, for example, decoded and/or used to access a table of reference watermarks that are mapped to media identifying information.

Audience measurement techniques can be used to help broadcasters and/or advertisers determine information about their radio listenership based on media watermarking. For example, a portable metering device can be used to capture the audio emanating from a media device such as a radio in a user's home or other location, such as an automobile. Panelists are users who have provided demographic information at the time of registration into a panel, allowing their demographic information to be linked to the media they choose to listen to or view. As a result, the panelists represent a statistically significant sample of the large population of radio consumers, for example, which allow broadcasting companies and advertisers to better understand who is utilizing their media content and maximize revenue potential. For example, audience measurement entities (AMEs) such as The Nielsen Company (US), LLC may provide a portable people meter (PPMs) to their panelists. The metering device can perform signal processing of the audio conveyed to a radio broadcast to extract the watermark symbols. An example watermark that is widely used is the Critical Band Encoding Technology (CBET) watermark invented by Jensen, et al. See U.S. Pat. Nos. 5,450,490 and 5,764,763, which are incorporated herein by reference. CBET watermarking consists of a data packet with 32 bits: 16 bits used for purposes of station identification and 16 bits used for a timestamp. For example, once a PPM has retrieved the watermark, the PPM can transmit the complete or partial watermark back to an AME. Besides watermarking using CBET, there are other encoding systems that insert an identifier into audio media. For example, the Nielsen Audio Encode System II (also known as NAES2) can insert a Nielsen source identifier and timestamp into, for example, an audio signal. Examples of watermarking techniques for encoding watermarks into media signals, such as audio signals, which can be supported by the teachings of this disclosure are described in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, U.S. Publication No. 2010/0223062, entitled "Methods and Apparatus to Perform Audio Watermarking and Watermark Detection and Extraction," which was published on Sep. 2, 2010, U.S. Pat. No. 6,871,180, entitled "Decoding of Information in Audio Signals," which issued on Mar. 22, 2005, U.S. Pat. No. 5,764,763, entitled "Apparatus and Methods for Including Codes in Audio Signals and Decoding," which issued on Jun. 9, 1998, U.S. Pat. No. 5,574,962, entitled "Method and Apparatus for Automatically Identifying a Program Including a Sound Signal," which issued on Nov. 12, 1996, U.S. Pat. No. 5,581,800, entitled "Method and Apparatus for Automatically Identifying a Program Including a Sound Signal," which issued on Dec. 3, 1996, U.S. Pat. No. 5,787,334, entitled "Method and Apparatus for Automatically Identifying a Program Including a Sound Signal," which issued on Jul. 28, 1998, and U.S. Pat. No. 5,450,490, entitled "Apparatus and Methods for Including Codes in Audio Signals and Decoding," which issued on Sep. 12, 1995, all of which are hereby incorporated by reference in their respective entireties.

An example CBET watermark is constructed using symbols representing 4 bits of data. Each of the symbols is encoded in 400 milliseconds of the media audio component and is created by embedding a particular set of 10 tones representing each symbol, with different sets of tones being used to represent different symbol values. Each of the tones belongs to a band of code consisting of several closely-spaced frequencies of the audio (e.g., 1-3 kHz frequency range for CBET watermarking). The 400 millisecond symbol block boundaries are typically not known to the meter decoding process, and a scan capturing a 256 millisecond window across an audio stream is performed. Given that environments in which radio audience measurements are performed can consist of a high ambient noise environment (e.g., a moving vehicle), the energy of embedded watermark tones can determine how well these watermarks can be detected. Therefore, it is important that watermarks embedded into radio broadcasts are properly encoded to ensure that the watermarks can be reliably detected in various listening environments. For example, a radio station may have a watermark monitor operating with a wired connection to its watermark encoder, and/or a monitor tuner to monitor the broadcast radio signal and confirm the watermarks are embedded properly in the transmitted signal. Watermark encoding that is not of good quality may cause the decoder to take longer to identify the watermark data, if the decoder is able to identify the watermark at all. A long response time needed to acquire a station identification conveyed by a watermark, for example, may also be an indicator that non-ideal listening environments may cause the station identification process to fail. As a result, identification of signal-to-noise ratio in various listening environments may help determine how to achieve successful decoding of the watermarks.

Media monitoring sites (MMSs) can be used to monitor radio station broadcasts to ensure that radio stations are producing optimally encoded watermarks. MMSs, for example, listen for broadcasts from radio stations to verify that the proper watermark encoding is employed (e.g., configured) to encode the respective watermarks. For example, an MMS can be used to verify that watermarks embedded in a given radio station broadcast contain correct data (e.g., station identifier, programming identifiers, etc.) In the event the wrong encoding is included or an encoding is not detected, the MMSs communicate with AME back offices to begin the troubleshooting process. However, while the infrastructure (e.g., site leases) and operating costs for MMSs may be justifiable in more populated areas with large television and radio audiences and large concentrations of radio stations, more remote areas that require monitoring and data collection may be more expensive or less cost efficient to maintain. Likewise, the installation of MMSs for purposes of monitoring watermark quality can be time-consuming, involving permitting and construction. Therefore, there is a need to validate radio station broadcast watermarks using means other than the construction and maintenance of MMSs, especially in areas that are not densely populated and/or that have a lower concentration of radio stations.

Example methods, systems and apparatus disclosed herein are directed towards using unmanned aerial vehicles (UAVs) to perform radio station monitoring in lieu of, or to augment or replace, MMSs. Examples disclosed herein allow for a reduction in cost associated with maintenance of MMSs by using lower-cost UAVs outfitted with a radio receiver, a watermark decoder and a communications (e.g., cellular, Wi-Fi, etc.) transceiver to fly to specified locations to monitor radio broadcasts. Examples disclosed herein allow versatile monitoring of radio stations by allowing UAVs to be programmed to visit radio stations based on a desired schedule. Examples disclosed herein allow one or more UAV(s) to perform radio station monitoring. Examples disclosed herein allow UAVs to monitor watermark quality and check for malfunctions of the radio station's broadcast signal. Examples disclosed herein enable the monitoring of stations in remote areas where the construction of MMSs to perform this monitoring is not feasible. Examples disclosed herein further reduce the need to send company representatives to sites that may be difficult to reach for purposes of troubleshooting situations that can instead be handled using UAV-based monitoring and troubleshooting capacities.

While examples disclosed herein are described in connection with radio station monitoring, disclosed techniques may also be used in connection with monitoring of other types of stations with broadcasting capability, such as television stations.

FIG. 1 is an illustration of an example environment of use 100 including example unmanned aerial vehicle(s) to monitor multiple radio stations according to a schedule. In the illustrated example of FIG. 1, an example unmanned aerial vehicle (UAV) 108 can be deployed to a first radio station (e.g., radio station A) to perform monitoring, followed by visits to other stations that the UAV 108 is scheduled to visit (e.g., radio stations B-D). The UAV 108 can be deployed based on a schedule (e.g., hourly basis, daily basis, etc.). However, the schedule can be updated conditionally based on different variables that influence the performance of the UAV. For example, the schedule can be updated based on the available power of the UAV (e.g., fly to the second radio station at a specified time if remaining power of UAV is greater than an estimated amount of power, threshold amount of power, etc., needed to complete the flight path before accessing a power generator or other means of, for example, recharging drone batteries). For example, at time 110, the UAV 108 is programmed to take an example flight path 111 to a first example station, radio station A. Once the UAV 108 has reached the radio station A at example time 112, the UAV 108 performs monitoring of the radio broadcast in accordance with the teachings of this disclosure to check whether the station is producing properly-encoded watermarks. The UAV 108 may also check other functions of the radio station, such as the power of the radio station broadcast signal. Upon completion of monitoring, the UAV 108 may be scheduled to proceed to a next example radio station, station B, by following the example flight path 114. At time 116, the UAV 108 arrives at the radio station B to perform monitoring of radio station B, followed by travelling an example flight path 118 to example radio station C to perform monitoring starting from example time 120. The UAV 108 proceeds to the last station on its monitoring list, example radio station D, by following example flight path 122. In the illustrated example, the UAV 108 monitors the station D and returns to the starting point (e.g., home base) where the UAV 108 was parked at time 110. In some examples, the UAV 108 may return to the initial radio station (e.g., radio station A) that it had visited at time 112, to perform the monitoring again at example time 128 in accordance with the programmed schedule (e.g., if the UAV 108 was programmed to visit the stations on an hourly basis and/or some other interval). For example, if the UAV 108 was scheduled to visit the station on a cyclic (e.g., hourly) basis, the UAV 108 returns to station B, station C, and station D at times 130, 132, and 134, respectively. In some examples, the UAV 108 may follow the same flight path (e.g., flight paths 114, 118, and 122) to travel from one station to the next. In some examples, the flight paths might be adjusted based on other variables, such as weather conditions, UAV range, or the need to recharge the UAV battery, etc. In some examples, the UAV 108 can have software programmed onto a commodity device such as Raspberry Pi, Arduino and/or onto any other processor or processors, to control operation of the UAV 108. In some examples, the UAV 108 schedule of radio station monitoring may be adjusted based on monitoring needs. In some examples, the number of radio stations monitored by the UAV 108 may be increased or decreased. In some examples, more than one UAV 108 (e.g., as part of a fleet of UAVs) may be deployed to a radio station to access a radio broadcast and perform monitoring.

Figure 2:
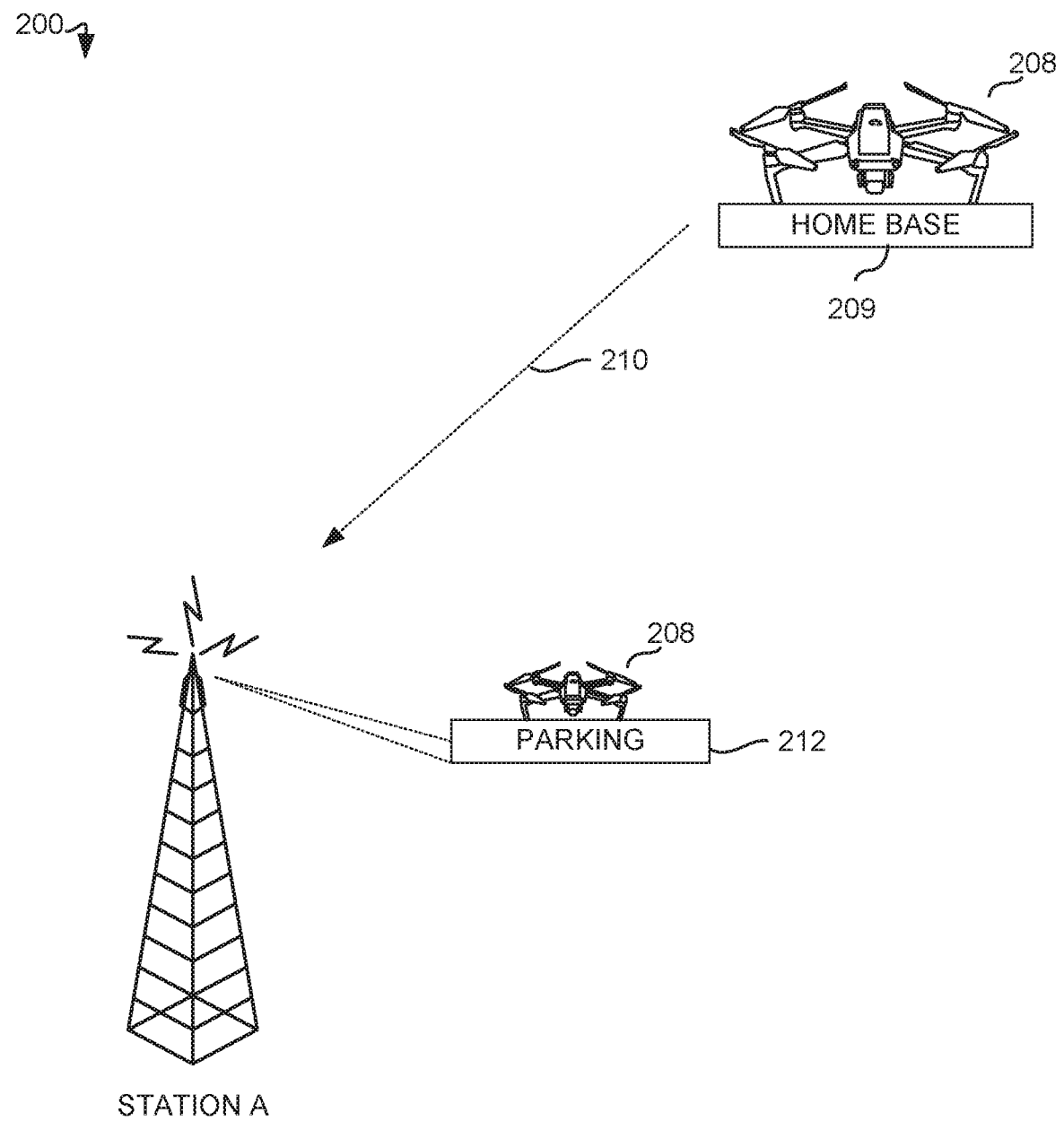
FIG. 2 is an illustration of an example use of an unmanned aerial vehicle dedicated to a particular radio station for purposes of monitoring.

FIG. 2 is an illustration of an example environment of use 200 in which an unmanned aerial vehicle is dedicated to a particular radio station for purposes of monitoring. In the example of FIG. 2, an example UAV 208 can be parked at a UAV parking location (e.g., an example home base 209). The UAV 208 is programmed to fly to its dedicated radio station (e.g., example station A) using example flight path 210. Once the UAV 208 arrives at station A, the UAV 208 can park at a UAV parking spot 212 to perform monitoring in order to conserve power and permit longer duration monitoring within the UAV's maximum flight time and flight range. In some examples, the UAV 208 can return to the home base 209 if the UAV 208 needs to be recharged or for maintenance purposes. In some examples, the UAV 208 may be able to recharge at an example radio station parking site 212. In some examples, more than one UAV 208 (e.g., as part of a fleet of UAVs) may be dedicated to a particular radio station (e.g., radio station A), based on monitoring needs and the lasting potential (e.g., battery/power capacity, flight range, etc.) of UAV 208 to perform the monitoring, so as to extend the monitoring lifetime of the UAV fleet.

Figure 3:
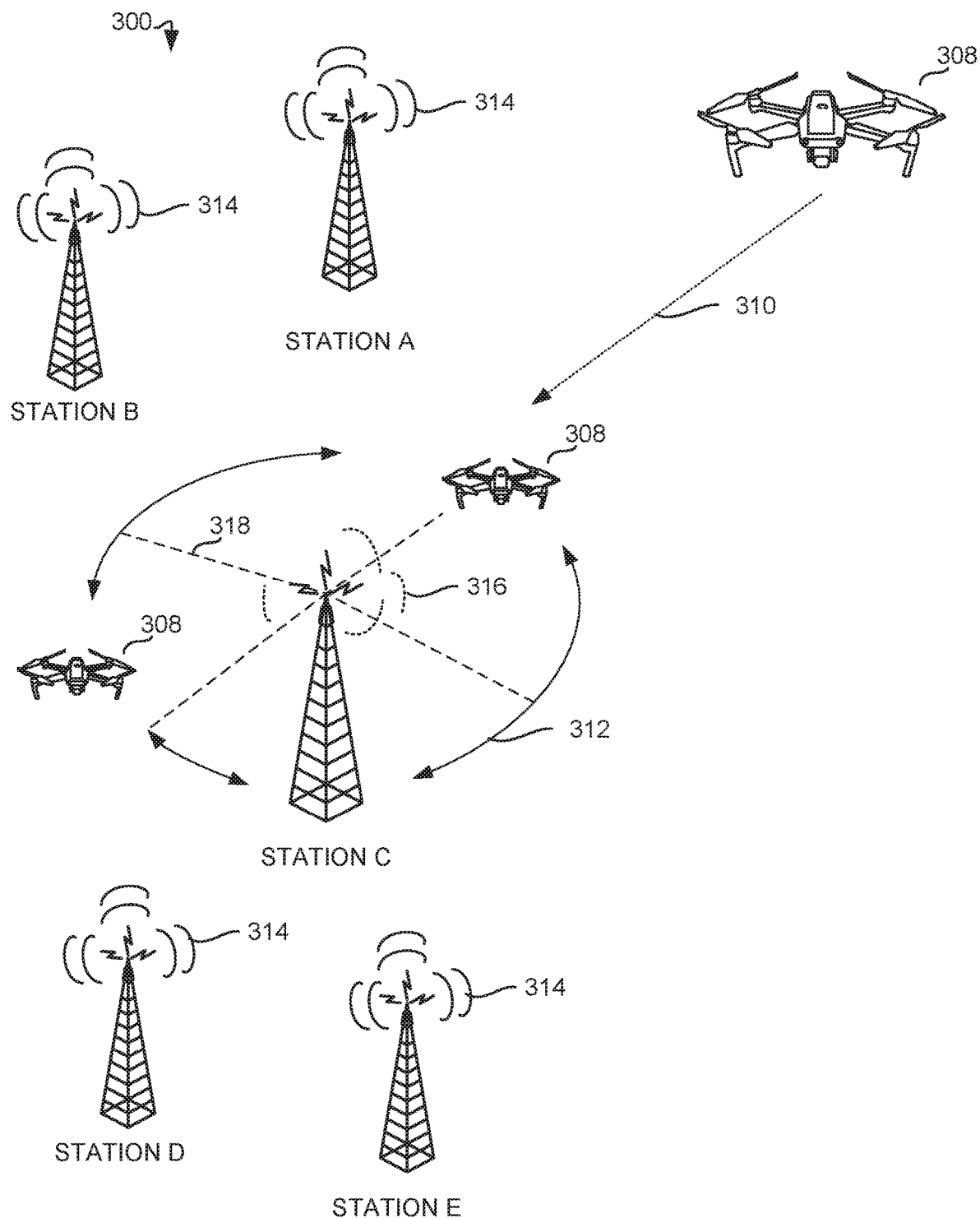
FIG. 3 is an illustration of an example use of an unmanned aerial vehicle for deployment to a radio station on an as-needed basis.

FIG. 3 is an illustration of an example environment of use 300 in which an unmanned aerial vehicle is deployed to a radio station on an as-needed basis. For example, several stations (e.g., example stations A-E) may be monitored to detect whether each radio station signal exhibits normal operation 314 or is exhibiting malfunctions 316. If a particular station (e.g., station C) exhibits potential signal malfunctions 316, an example UAV 308 can be deployed to check for and debug any radio-frequency (RF) related malfunctions that are confirmed at the site. The UAV 308 may be deployed based on an example flight path 310 to the radio station exhibiting signal malfunction (e.g., radio station C). At station C, the UAV 308 may be controlled to fly around the radio station's antenna(s) (e.g., using an example flight path 312, such as a substantially circular flight path, within an error tolerance, around the radio station based on a programmed radius/distance from the radio station) to monitor signal 316 strength and watermark detectability of the accessed radio broadcast. In some examples, the UAV 308 may identify particular quadrant(s) exhibiting RF problems. In some examples, the UAV 308 may be deployed to other radio stations (e.g., radio stations A, B, D or E) that may be exhibiting similar signal problems. In some examples, more the one UAV (e.g., as part of a fleet of UAVs) may be deployed to monitor a given radio station (e.g., radio station C) exhibiting signal problems.

Figure 4:
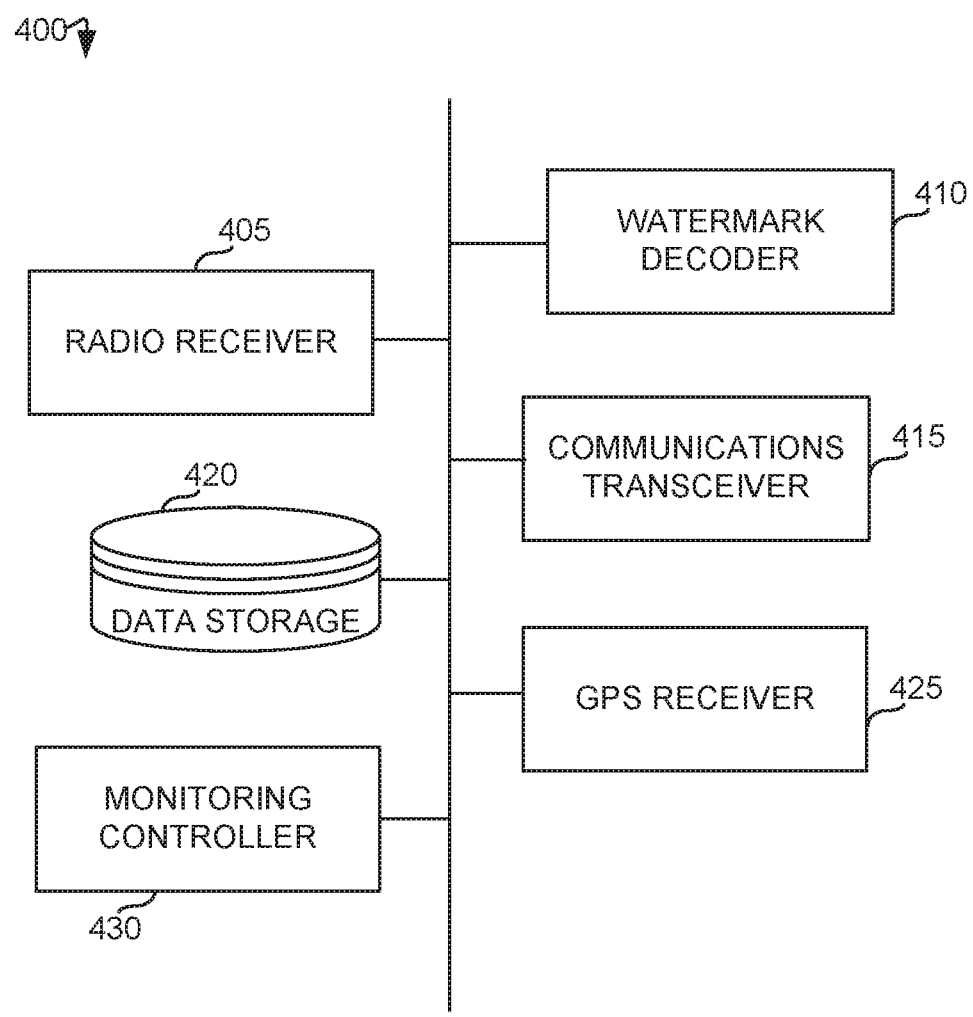
FIG. 4 is a block diagram of an example implementation of the unmanned aerial vehicles in FIGS. 1-3 to perform radio station monitoring in accordance with the teachings of this disclosure.

FIG. 4 is a block diagram of an example implementation of an example UAV 400 to perform radio station monitoring. The example UAV 400 can be used to implement one or more of the UAVs 108, 208, and/or 308 of FIGS. 1-3. The example of FIG. 4 illustrates aspects of the UAV 400 that implement radio station monitoring in accordance with the teachings of this disclosure. Other implementation aspects directed to typical UAV operation (e.g., flight control, battery charging, etc.) are omitted for clarity.

The example UAV 400 includes an example radio receiver 405, an example watermark decoder 410, an example communications transceiver 415, an example data storage 420, an example Global Positioning System (GPS) receiver 425, and an example monitoring controller 430. The on-board radio receiver 405 is used by the UAV 400 to receive radio broadcasts when the UAV 400 is performing radio station monitoring. The example radio receiver 405 may be used to determine whether a radio station signal is normal or malfunctioning (e.g., normal radio signal 314 versus weak radio signal 316 of FIG. 3). The radio receiver 405 can be implemented by any type(s) and/or number(s) of radio receivers. For example, the radio receiver 405 may include or be implemented by one or more Amplitude Modulation (AM) radio receivers, Frequency Modulation (FM) radio receivers, satellite radio receivers, shortwave radio receivers, etc., and/or any combination(s) thereof.

The example watermark decoder 410 is included in the UAV 400 to analyze the signal received from a radio station using the radio receiver 405 to determine whether a detected watermark has been properly encoded. In some examples, the watermark decoder 120 is implemented by a modified CBET watermark decoder, which performs a sliding 256-millisecond block analysis using a Discrete Fourier Transform (DFT) to detect CBET watermark symbols. Additionally or alternatively, in some examples, the watermark decoder 410 may be used to detect watermark symbols encoded according to other watermarking technologies. Examples of such watermark decoders that may be used to implement the watermark decoder 410 include, but are not limited to, examples disclosed in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, U.S. Publication No. 2010/0223062, entitled "Methods and Apparatus to Perform Audio Watermarking and Watermark Detection and Extraction," which was published on Sep. 2, 2010, U.S. Pat. No. 6,871,180, entitled "Decoding of Information in Audio Signals," which issued on Mar. 22, 2005, U.S. Pat. No. 5,764,763, entitled "Apparatus and Methods for Including Codes in Audio Signals and Decoding," which issued on Jun. 9, 1998, U.S. Pat. No. 5,574,962, entitled "Method and Apparatus for Automatically Identifying a Program Including a Sound Signal," which issued on Nov. 12, 1996, U.S. Pat. No. 5,581,800, entitled "Method and Apparatus for Automatically Identifying a Program Including a Sound Signal," which issued on Dec. 3, 1996, U.S. Pat. No. 5,787,334, entitled "Method and Apparatus for Automatically Identifying a Program Including a Sound Signal," which issued on Jul. 28, 1998, and U.S. Pat. No. 5,450,490, entitled "Apparatus and Methods for Including Codes in Audio Signals and Decoding," which issued on Sep. 12, 1995, all of which are hereby incorporated by reference in their respective entireties. In some examples, the watermark decoder 410 can determine both the decoded watermark symbols and one or more symbol strength metrics for the decoded symbols. In some examples, the watermark decoder 410 may determine statistics of properly decoded watermarks (e.g., based on number of detected watermarks with errors, gaps in watermarks, etc.)

The example communication transceiver 415 is included in the UAV 400 to report the detected watermarks to a company back office. The example communications transceiver 415 can be implemented by any type(s) and/or number(s) of communication transceivers (e.g., cellular, Wi-Fi, satellite, Bluetooth, etc., or any combination thereof). The example data storage 420 is included in the UAV 400 to store information such as, for example, the decoded watermark symbols, the schedules, flight paths, home base location(s), station location(s), etc. The GPS receiver 425 is included in the UAV 400 to navigate to radio stations based on real-time specified flight paths (e.g., flight paths 111, 114, 118, 122 of FIG. 1, flight path 210 of FIG. 2, and flight paths 310 and 312 of FIG. 3), paths to the home base location(s), etc. The example monitoring controller 430 is included in the UAV 400 to control the UAV 400 system components (e.g., radio receiver 405, watermark decoder 410, communications receiver 415, data storage 420, and GPS receiver 425), as disclosed in further detail below.

Figure 5:
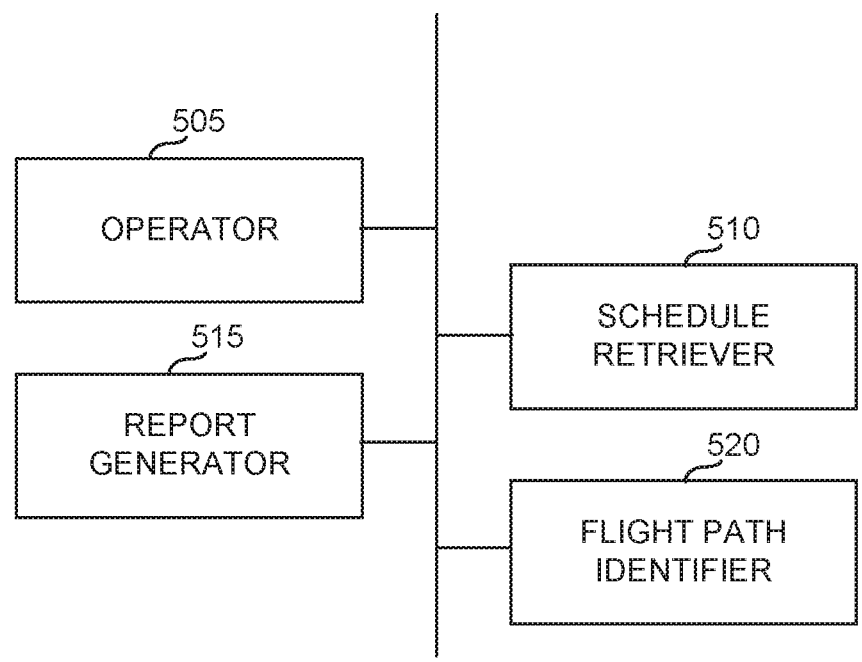
FIG. 5 is a block diagram of an example implementation of a monitoring controller of unmanned aerial vehicles in FIGS. 1-3 to perform radio station monitoring in accordance with the teachings of this disclosure.

FIG. 5 is a block diagram of an example implementation of the monitoring controller 430 of FIG. 4, which may be used to implement one or more of the unmanned aerial vehicles in FIGS. 1-3 to perform radio station monitoring in accordance with the teachings of this disclosure. The example monitoring controller 430 of FIG. 5 includes an example operator 505, an example schedule retriever 510, an example report generator 515, and an example flight path identifier 520. The operator 505 is included in the monitoring controller to control the operation of the UAV 400, which includes the management of the combined function of the elements of UAV 400 (e.g., radio receiver 405, watermark decoder 410, communications transceiver 415, UPS receiver 425, etc.). For example, given that these elements of the UAV 400 perform their function separately, the operator 505 of the monitoring controller 430 processes the information received (e.g., from the back office) and manages operation of the UAV 400 based on, for example, the flight schedule, the UAV conditions (e.g., power consumption), etc.

The monitoring controller 430 also includes a schedule retriever 510 to receive and process one or more schedules communicated by the back office to the UAV 400. For example, the schedule retriever 510 may perform schedule updates (e.g., via push and/or pull download techniques) to allow the flight path of the UAV 400 to change over time, to allow for real-time adjustment of the flight path depending on instructions received from the back office and implemented by the UAV 400, etc. The monitoring controller 430 also includes a report generator 515 to generate one or more monitoring reports to send to a remote receiver (e.g., back office) using the communications transceiver 415 when, for example, radio station monitoring conditions have been met. The monitoring controller 430 also includes a flight path identifier 520 to identify the UAV 400 flight path, using the GPS receiver 425.

Figure 6:
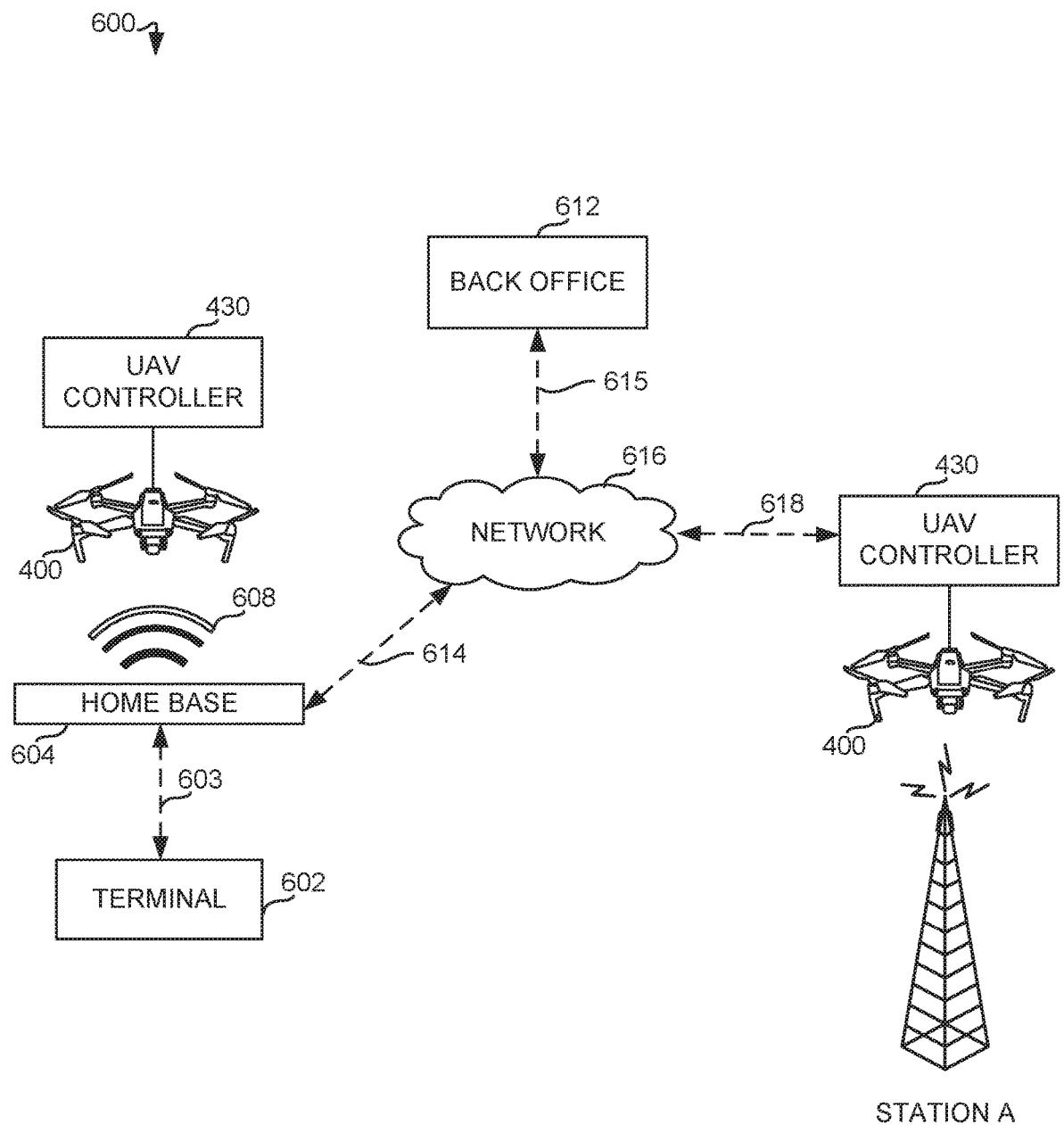
FIG. 6 is a block diagram illustrating an example configuration of unmanned aerial vehicles of FIGS. 1-3 to perform radio station monitoring.

FIG. 6 is a block diagram illustrating an example configuration 600 of the example UAV 400 of FIG. 4 (which may implement one or more of the unmanned aerial vehicles of FIGS. 1-3) to perform radio station monitoring. In the example configuration 600, the unmanned aerial vehicle 400 which is located at an example home base 604 may be configured using the UAV monitoring controller 430 of FIG. 4 based on instructions received from an example back office 612. The instructions may include the schedule that the example UAV 400 is instructed to follow during deployment to a radio station (e.g., radio station A of FIG. 6). For example, when the UAV 400 is located at the home base 604, the back office 612 can establish communication 614, 615 via the example network 616 with the UAV 400 home base 604, which can communicate with the UAV controller 430 using, for example, a short-range signal 608 (e.g., Wi-Fi, Bluetooth, infrared, mobile cellular and/or cabled connection, etc.), allowing the home base 604 to act as a relay between the back office 612 and the UAV 400. Additionally, the home base 602 can communicate 603 with a terminal 602 to allow, for example, a human operator to configure the UAV directly from the home base 604. Once the UAV 400 is deployed to a radio station (e.g., radio station A), any further communication 618 between the UAV 400 and the back office 612 can occur using the network 616. The example network 616 may be implemented using any suitable wired and/or wireless network(s) including, for example, one or more data buses, one or more Local Area Networks (LANs), one or more wireless LANs, one or more cellular networks, the Internet, etc. For example, once the UAV 400 has completed monitoring of radio station A, the UAV controller 430 manages the process of retrieving the stored data (e.g., watermarks decoded using the watermark decoder 410 and stored in data storage 420), generating the report to send to the back office 612 using the report generator 515, and communicating the report via network 616 to the back office 612 using the communications transceiver 415.

While an example manner of implementing unmanned aerial vehicles 108, 208, and 308 of FIGS. 1-3 is illustrated by the example UAV 400 of FIGS. 4-5, one or more of the elements, processes and/or devices illustrated in FIGS. 4-5 may be combined, divided, re-arranged, omitted, eliminated and/or implemented in any other way. Further, the example radio receiver 405, the example watermark decoder 410, the example communications transceiver 415, the example data storage 420, the example GPS receiver 425, the example monitoring controller 430, the example operator 505, the example schedule retriever 510, the example report generator 515, and the example flight path identifier 520 and/or, more generically, the example unmanned aerial vehicle 400 of FIGS. 4-5 may be implemented by hardware, software, firmware and/or any combination of hardware, software and/or firmware. Thus, for example, any of the example radio receiver 405, the example watermark decoder 410, the example communications transceiver 415, the example data storage 420, the example GPS receiver 425, the example monitoring controller 430, the example operator 505, the example schedule retriever 510, the example report generator 515, the example flight path identifier 520 and/or, more generically, the example unmanned aerial vehicle 400 of FIGS. 4-5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example UAV 400, the example radio receiver 405, the example watermark decoder 410, the example communications transceiver 415, the example data storage 420, the example GPS receiver 425, the example monitoring controller 430, the example operator 505, the example schedule retriever 510, the example report generator 515, and/or the example flight path identifier 520 is/are hereby expressly defined to include a non-transitory computer readable storage device or storage disk such as a memory, a digital versatile disk (DVD), a compact disk (CD), a Blu-ray disk, etc. including the software and/or firmware. Further still, the example unmanned aerial vehicle 400 may include one or more elements, processes and/or devices in addition to, or instead of, those illustrated in FIGS. 4-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example machine readable instructions for implementing the unmanned aerial vehicle 400 of FIGS. 4-5 are shown in FIGS. 7-10, respectively. The machine-readable instructions may be one or more executable programs or portion(s) of an executable program for execution by a processor such as the processor 806 shown in the example processor platform 800 discussed below in connection with FIGS. 7-10. The program may be embodied in software stored on a non-transitory computer readable storage medium such as a CD-ROM, a floppy disk, a hard drive, a digital versatile disk (DVD), a Blu-ray disk, or a memory associated with the processor 1106, but the entire program and/or parts thereof could alternatively be executed by a device other than the processor 1106 and/or embodied in firmware or dedicated hardware. Further, although the example program is described with reference to the flowcharts illustrated in FIGS. 7-10, many other methods of implementing the example unmanned aerial vehicle 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 7, 8, 9 and/or 10 may be implemented using executable instructions (e.g., computer and/or machine readable instructions) stored on a non-transitory computer and/or machine readable medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 7:
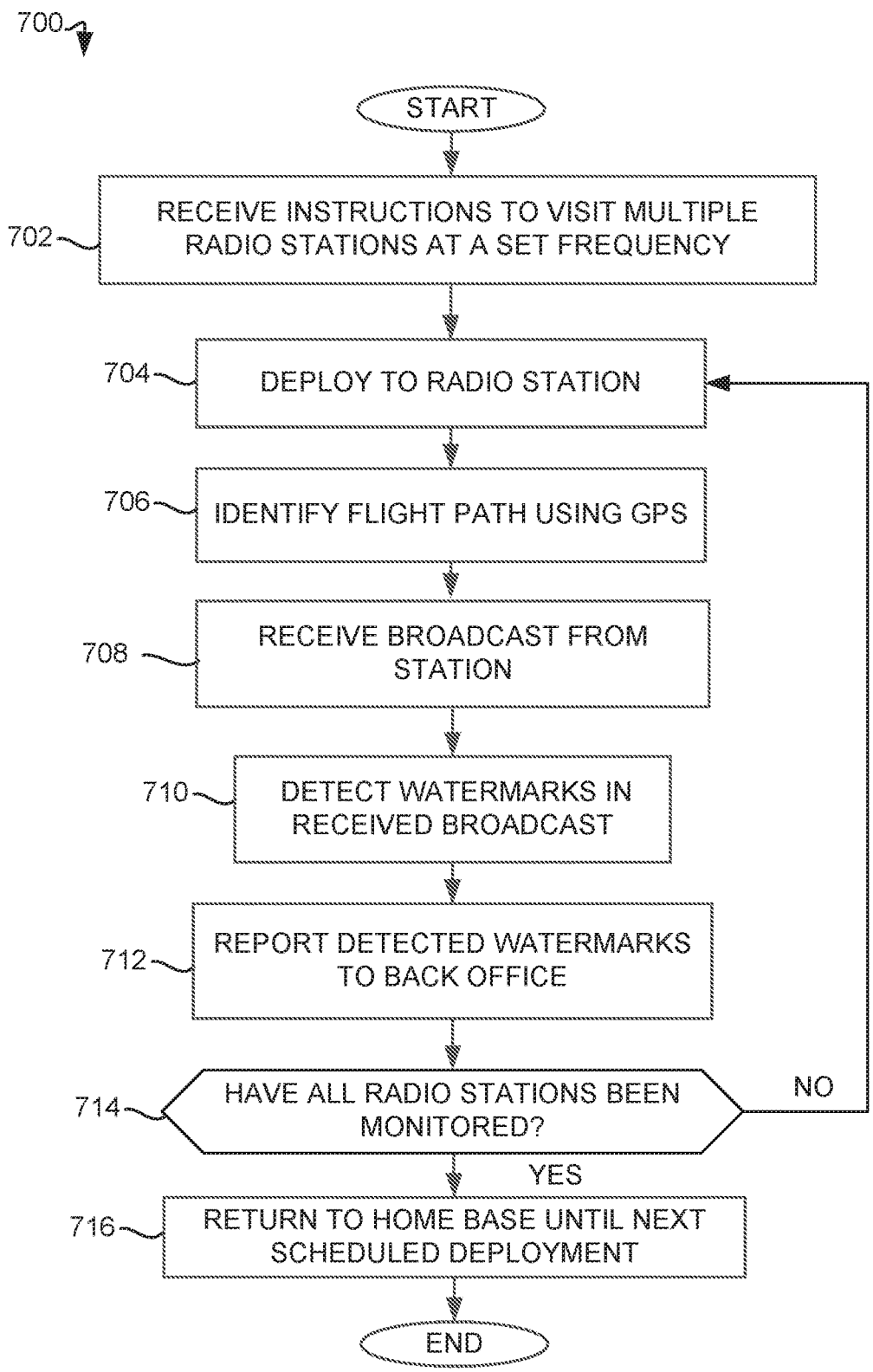
FIG. 7 is a flowchart representative of example machine-readable instructions that may be executed by the unmanned aerial vehicles of FIGS. 1-3 to monitor multiple radio stations according to a schedule.

FIG. 7 is a flowchart 700 representative of example machine-readable instructions that may be executed by the unmanned aerial vehicle 400 of FIGS. 4-5 to monitor multiple radio stations according to a schedule (e.g., such as when implementing the UAV 108 of FIG. 1). At block 702, the UAV 400 of FIG. 1 receives instructions to visit multiple radio station locations at, for example, a specified frequency. For example, the UAV 400 may be configured by the monitoring controller 430 of FIG. 4 to visit the radio stations A-D on an hourly basis. At block 704, the UAV 400 deploys to a radio station, such as the first station (e.g., radio station A) that the UAV 108 is programmed to visit. For example, the UAV 400 may be configured using the UAV monitoring controller 430 of FIG. 4, based on instructions sent by the back office 612, to visit a radio station site on a schedule that can be, for example, cyclic or change in real-time based on monitoring needs. At block 706, the UAV 400 is guided to visit the first radio station location using the GPS receiver 425 of FIG. 4, which is managed by the flight path identifier 520. In some examples, the flight path taken by the UAV 400 (e.g., flight path 111 of FIG. 1) may be performed in real-time if an operator is operating the UAV 400 remotely. In some examples, the flight path is based on a global positioning system auto-pilot flight path. The flight path taken by the UAV 400 can further be determined by the flight path identifier 520 based on the schedule retrieved using the schedule retriever 510. At block 708, the UAV 400 arrives at the radio station location at a designated time 112 and receives the radio station (e.g., radio station A) broadcast using the radio receiver 405. At block 710, the UAV 400 detects the watermarks using the watermark decoder 410 in the radio broadcast received using the radio receiver 405. The UAV 400 may store any information that needs to be transmitted to a back office using the data storage 420. At block 712, the UAV 400 reports, using the example communications transceiver 415, the watermarks detected using the watermark decoder 410 to the back office for processing after a report is generated using the report generator 515. If, at block 714, not all of the radio stations which the UAV 108 was programmed to visit were monitored by the UAV 400, the UAV 400 proceeds on a flight path (e.g., flight path 114 of FIG. 1) to the next radio station (e.g., radio station B), in order to arrive to the station by the time 116. Once the UAV 400 performs monitoring of all the stations (e.g., stations A-D), the UAV 400 can return to the UAV parking position (e.g., home base), at block 716, until the next scheduled monitoring deployment. In some examples, the UAV 400 continues to re-visit the radio stations if the next visiting time point 128 requires that the UAV 400 leaves the last radio station monitored (e.g., radio station D) and proceeds directly to the first station monitored (e.g., radio station A).

Figure 8:
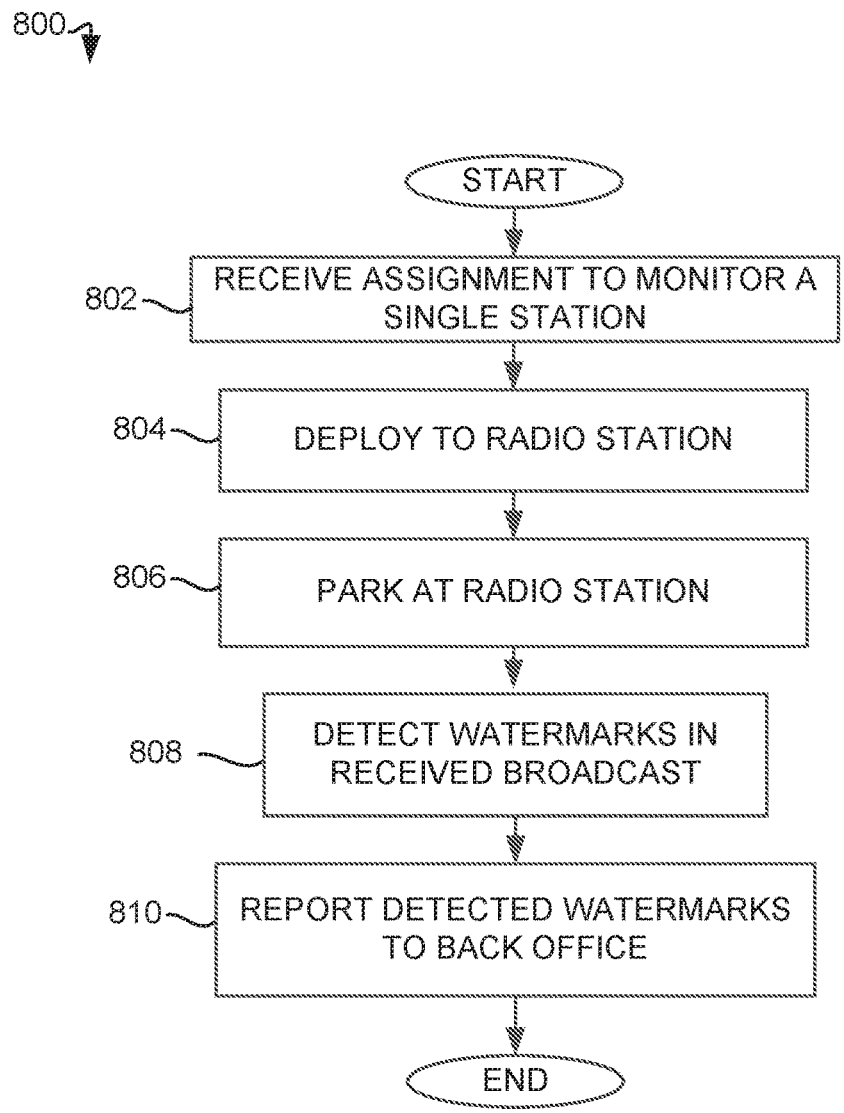
FIG. 8 is a flowchart representative of example machine-readable instructions that may be executed by the unmanned aerial vehicles of FIGS. 1-3 to monitor a particular radio station to which an unmanned aerial vehicle is dedicated.

FIG. 8 is a flowchart 800 representative of example machine-readable instructions that may be executed by the unmanned aerial vehicle 400 (e.g., when implementing the UAV 208 of FIG. 2) to monitor a particular radio station to which the UAV 400 is dedicated. At block 802, the UAV 400 receives an assignment from a back office to monitor a single radio station (e.g., radio station A of FIG. 2), such that the UAV 400 is dedicated specifically to radio station A. For example, the monitoring controller 430 of FIG. 4 configures the UAV 400 based on a schedule provided by a back office. At block 804, the UAV 400 deploys to the radio station (e.g., radio station A) along a flight path (e.g., flight path 210) determined using the flight path identifier 520, using the GPS receiver 425 of FIG. 4, if it is configured to monitor that radio station. At block 806, the UAV 400 parks at the radio station (e.g., UAV parking 212) to perform the monitoring on-site. In some examples, the UAV 400 may remain parked at the designated radio station until it is recalled back to its home base (e.g., home base 209). In some examples, the UAV 400 may be programmed to spend a threshold amount of time at the radio station it is assigned to monitor before returning to the home base 209 to, for example, refuel or receive maintenance. At block 808, the UAV 400 detects watermarks in the radio station (e.g., radio station A) broadcast, using the watermark decoder 410 of FIG. 4. The UAV 400 may store any decoded signals or other information using a data storage 420. At block 610, the UAV 400 reports the detected watermarks to the back office using the communications transceiver 415, after a report is generated using the report generator 515.

Figure 9:
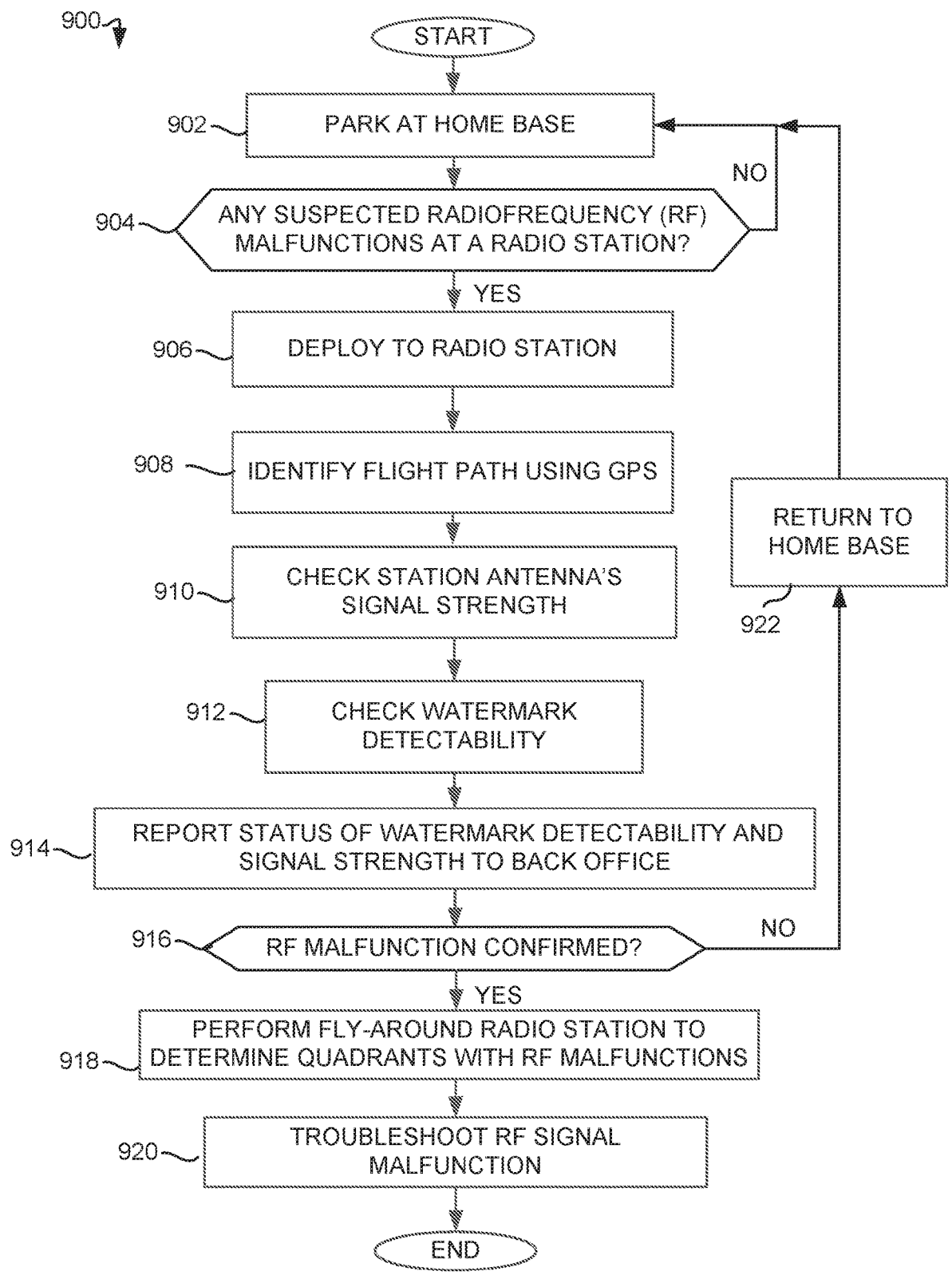
FIG. 9 is a flowchart representative of example machine-readable instructions that may be executed by the unmanned aerial vehicles of FIGS. 1-3 to deploy to a radio station on an as-needed basis.

FIG. 9 is a flowchart 900 representative of example machine-readable instructions that may be executed by the UAV 400 (e.g., such as when implementing the UAV 308 of FIG. 3) to deploy to a radio station on an as-needed basis. At block 902, the UAV 400 is parked at a home base awaiting deployment to a radio station for monitoring purposes. If, at block 904, there are any suspected radio-frequency (RF) malfunctions at a radio station (e.g., radio stations A-E of FIG. 3), the UAV 400 is deployed to the radio station. For example, during radio station signal interception, there may be a detection that one of the stations (e.g., radio station C) is experiencing signal problems 316 while other stations in the area (e.g., stations A, B, D, and E) may have normal broadcasting signals 314. At block 906, a malfunction in the radio-frequency signal initiates the UAV 400 deployment to the radio station experiencing RF-related malfunctions (e.g., radio station C). For example, the home base or back office can send a command to the controller 430 causing the UAV 400 to be configured to follow a new schedule and flight path. The UAV 400 uses the GPS receiver 425 of FIG. 4 to be guided to the station location based on the flight path identifier 520, at block 908, based on a predefined flight path 310, or based on an operator-based flight path. At block 910, the UAV 400 checks the radio station's antenna signal strength to confirm any RF-related signal malfunctions, such as determining variations in radio-frequency signal strength. At block 912, the UAV 400 checks for watermark detectability using the watermark decoder 410 of FIG. 4. The UAV 400 stores any information regarding the radio station monitoring results in the data storage 420. At block 914, the UAV 400 reports the status of watermark detectability (e.g., presence of a watermark error) and signal strength to the back office using the communications transceiver 415. At block 916, the RF malfunction is confirmed or denied, and the UAV 400 either returns to the home base if there are no further signal malfunctions detected, or the UAV 400 engages in a detailed assessment of the RF-related signal malfunction occurring at the radio station of interest. At block 918, the UAV 400 may perform a fly-around the radio station using the flight path 312 to engage in monitoring of different quadrants which are experiencing RF malfunction as part of a troubleshooting process. For example, the radiation pattern of a radio station antenna may be assessed by the UAV 400 to determine how the pattern is changing and how far it reaches, since this affects areas that may not be able to receive the radio station signal. Based on the detected respective areas of RF-related signal malfunction, the UAV 400 may engage in further troubleshooting processes, at block 920. For example, the troubleshooting operation can include re-examining the areas experiencing RF-related signal malfunctions and performing assessments of the areas that are experiencing the RF-related malfunctions (e.g., calculating total broadcast coverage areas with limited signal, etc.) Reports of the detailed monitoring performed by the UAV 400 can be submitted to the back office for further evaluation and subsequent performance of steps to apply necessary corrections to the signal. For example, the UAV 400 may assist in the correction of the signal by re-setting the signal via the radio station. Once the signal is corrected, the UAV 400 may return to the home base or perform further monitoring to ensure that the signal quality and watermark encoding are proper. If the troubleshooting steps at block 920 do not remedy the RF-related signal malfunctions, other UAVs may be deployed to the radio station experiencing technical difficulties or a representative may be scheduled to visit the site.

Figure 10:
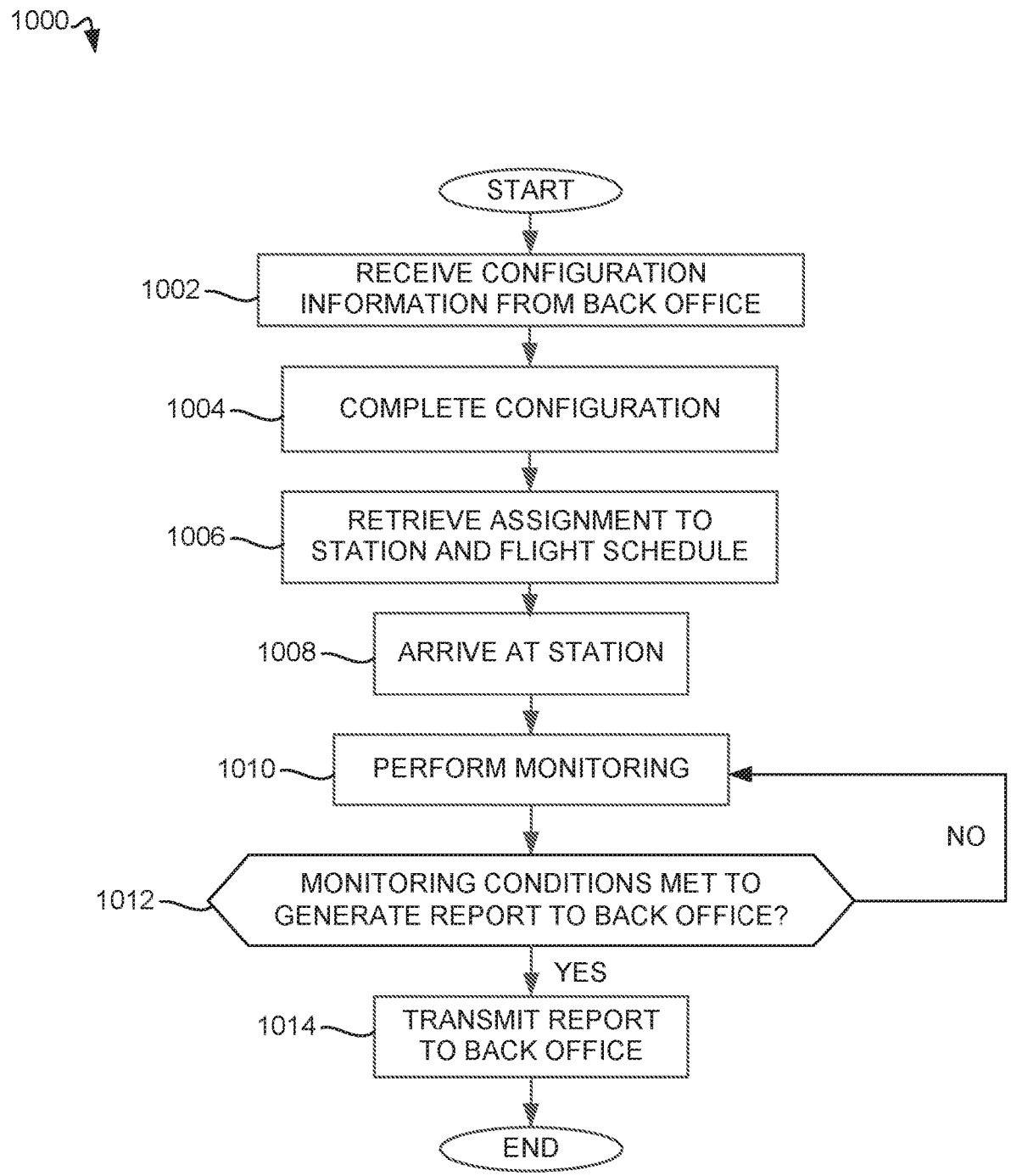
FIG. 10 is a flowchart representative of example machine-readable instructions that may be executed by the unmanned aerial vehicle of FIG. 6 using the monitoring controller of FIG. 5 to perform unmanned aerial vehicle configuration.

FIG. 10 is a flowchart 1000 representative of example machine-readable instructions that may be executed by the UAV 400 (e.g., in the example of FIG. 6) using the monitoring controller 430 to perform unmanned aerial vehicle configuration. At block 1002, the UAV 400 receives configuration information from the back office 612. The configuration information is implemented using the UAV monitoring controller 430 to set the flight path and flight schedule. Once the configuration step is completed at block 1004, the UAV operator 505 of the monitoring controller 430 retrieves the schedule, using the schedule retriever 510, and the flight path, using the flight path identifier 520, at block 1006. At block 1008, the UAV 400 arrives at the designated radio station using the GPS receiver 425 to complete the flight path retrieved from the flight path identifier 520. At block 1010, the UAV 400 performs radio station monitoring by receiving the radio broadcast using the radio receiver 405, and performing watermark detection and decoding using the watermark decoder 410, the results of the decoding being stored in the data storage 420. At block 1012, the UAV controller 430 determines whether monitoring is complete and monitoring conditions have been met that allow for a report generator 515 to generate a report that is sent to the back office via the network 616. For example, the monitoring conditions may include the time of monitoring, the radio station location, the decoded watermarks, any assessment of the watermarks (e.g., statistical assessment of number of watermarks with error, watermarks with gaps, etc.), etc. If, at block 1012, the monitoring conditions are not identified for incorporating into a report to the sent to the back office, the UAV 400 continues to perform monitoring at block 1010. If, at block 1012, data needed to generate a report to be sent to the back office has been gathered, the report is generated using the report generator 515 and transmitted to the back office using communications transceiver 415 via the network 616, at block 1014.

Figure 11:
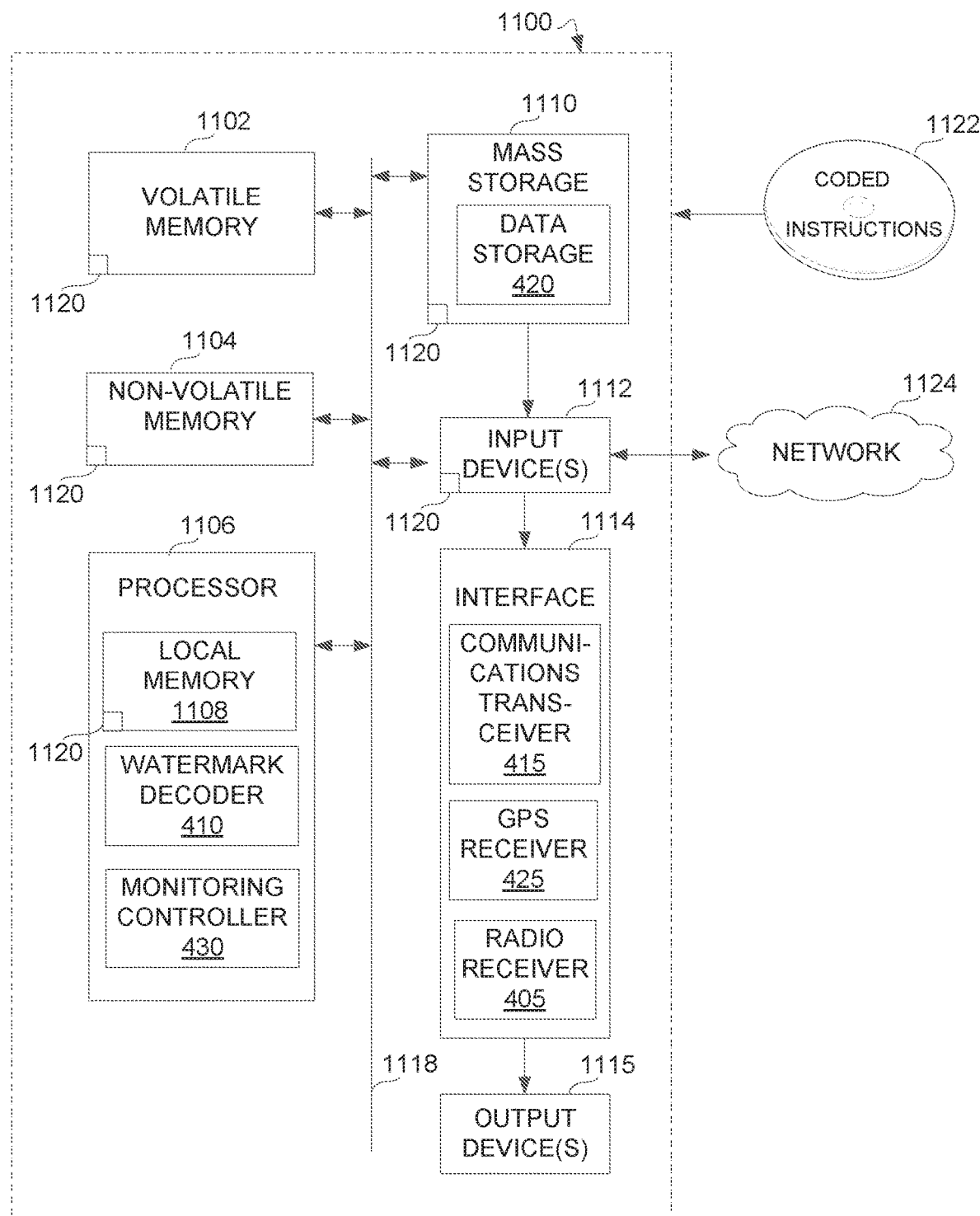
FIG. 11 is a block diagram of an example processing platform structured to execute the instructions of FIG. 7-10 to implement the example unmanned aerial vehicle of FIG. 4.

FIG. 11 is a block diagram of an example processing platform structured to execute the instructions of FIG. 7-10 to implement the example UAV 400 of FIG. 4. The processor platform 1100 can be, for example, a computer, a self-learning machine (e.g., a neural network), a mobile device (e.g., a cell phone, a smart phone, a tablet such as an iPad™), a personal digital assistant (PDA), or any other type of computing device.

The processor platform 1100 of the illustrated example includes a processor 1106. The processor 1106 of the illustrated example is hardware. For example, the processor 1106 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1106 implements the watermark decoder 410 and the monitoring controller 430.

The processor 1106 of the illustrated example includes a local memory 1108 (e.g., cache). The processor 1106 of the illustrated example is in communication with a main memory including a volatile memory 1102 and a non-volatile memory 1104 via a bus 1118. The volatile memory 1102 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1104 may be implemented by flash memory and/or any other desired type of memory device. Access to the main memory 1102 and 1104 is controlled by a memory controller.

The processor platform 1100 of the illustrated example also includes an interface circuit 1114. The interface circuit 1114 may be implemented by any type of interface standard, such as an Ethernet interface, a universal serial bus (USB), a Bluetooth® interface, a near field communication (NFC) interface, and/or a PCI express interface.

In the illustrated example, one or more input devices 1112 are connected to the interface circuit 1114. The input device(s) 1112 permit(s) a user to enter data and commands into the processor 1106. The input device(s) can be implemented by, for example, an audio sensor, a microphone, a camera (still or video), a keypad, a button, a touchscreen, isopoint and/or a voice recognition system.

One or more output devices 1116 are also connected to the interface circuit 1114 of the illustrated example. The output devices 1116 can be implemented, for example, by display devices (e.g., a light emitting diode (LED), an organic light emitting diode (OLED), a liquid crystal display (LCD), an in-place switching (IPS) display, a touchscreen, etc.), a tactile output device, and/or speaker, etc. The interface circuit 1114 of the illustrated example, thus, may include a graphics driver card, a graphics driver chip or a graphics driver processor.

The interface circuit 1114 of the illustrated example also includes a communication device such as a transmitter, a receiver, a transceiver, a modem, a residential gateway, a wireless access point, and/or network interface to facilitate exchange of data with external machines (e.g., computing devices of any kind) via a network 1124. The communication can be via, for example, an Ethernet connection, a satellite system, a line-of-site wireless system, a cellular telephone system, etc. In this example, the interface circuit 1114 includes the communications transceiver 415, the GPS receiver 425, and the radio receiver 405.

The processor platform 1100 of the illustrated example also includes one or more mass storage devices 1110 for storing software and/or data. Examples of such mass storage devices 1110 include floppy disk drives, hard drive disks, compact disk drives, Blu-ray disk drives, redundant array of independent disks (RAID) systems, and digital versatile disk (DVD) drives. In this example, the mass storage 1110 includes the data storage 420.

The machine executable instructions 1120 of FIGS. 5-7 may be stored in the mass storage device 1110, in the volatile memory 1102, in the non-volatile memory 1104, and/or on a removable non-transitory computer readable storage medium such as a CD or DVD.

Although certain example methods, apparatus and system have been disclosed herein, the scope of coverage of this patent is not limited thereto. On the contrary, this patent covers all methods, apparatus and articles of manufacture fairly falling within the scope of the claims of this patent.

What is claimed is:

1. An unmanned aerial vehicle, the vehicle comprising:
    a radio receiver to receive a radio broadcast from at least one radio station;
    a watermark detector to detect a watermark in the received radio broadcast;
    a communication transceiver to report at least one of a detected watermark or information associated with the detected watermark to a remote receiver; and
    a monitoring controller to control the unmanned aerial vehicle to travel to a first radio station site and to park at the first radio station site to monitor the radio broadcast.

2. The unmanned aerial vehicle of claim 1, wherein the monitoring controller is to control the unmanned aerial vehicle to visit multiple radio station locations based on a schedule.

3. The unmanned aerial vehicle of claim 2, wherein the schedule includes a condition based on available power of the unmanned aerial vehicle.

4. The unmanned aerial vehicle of claim 1, wherein the monitoring controller is to control the unmanned aerial vehicle to perform a troubleshooting operation associated with the at least one radio station in response to identification by the unmanned aerial vehicle of a watermark error in the received radio broadcast.

5. The unmanned aerial vehicle of claim 4, wherein to perform the troubleshooting operation, the monitoring controller is to cause the unmanned aerial vehicle to travel to different quadrants of a radio station antenna of the at least one radio station to perform watermark detection with a watermark decoder in the different quadrants.

6. The unmanned aerial vehicle of claim 1, wherein the monitoring controller is to control the unmanned aerial vehicle to park until deployment to the at least one radio station is initiated, the deployment to the station based on a Global Positioning System auto-pilot flight path.

7. A method for performing radio station monitoring using an unmanned aerial vehicle, the method comprising:
    receiving a radio broadcast from at least one radio station with a radio receiver at the unmanned aerial vehicle;
    detecting, by executing an instruction with a processor, a watermark in the received radio broadcast;
    reporting, by executing an instruction within the processor, at least one of the detected watermark or information associated with the detected watermark to a remote receiver; and
    controlling, by executing an instruction within the processor, the unmanned aerial vehicle to travel to a first radio station site and to park at the first radio station site to monitor the radio broadcast.

8. The method of claim 7, further including controlling the unmanned aerial vehicle to visit multiple radio station locations based on a schedule.

9. The method of claim 8, wherein the schedule includes a condition based on available power of the unmanned aerial vehicle.

10. The method of claim 7, further including controlling the unmanned aerial vehicle to perform a troubleshooting operation associated with the at least one radio station in response to identification by the unmanned aerial vehicle of a watermark error in the received radio broadcast.

11. The method of claim 10, wherein the troubleshooting operation includes causing the unmanned aerial vehicle to travel to different quadrants of a radio station antenna of the at least one radio station to perform watermark detection in the different quadrants.

12. The method of claim 7, further including controlling the unmanned aerial vehicle to park until deployment to the at least one radio station is initiated, the deployment to the station based on a Global Positioning System auto-pilot flight path.

13. A non-transitory computer readable storage medium comprising instructions that, when executed, cause a processor of an unmanned aerial vehicle to at least:
    access a radio broadcast from at least one radio station;
    detect a watermark in the radio broadcast;
    report at least one of the detected watermark or information associated with the detected watermark to a remote receiver; and
    travel to a first radio station site and to park at the first radio station site to monitor the radio broadcast.

14. The non-transitory computer readable storage medium of claim 13, wherein the instructions, when executed, cause the unmanned aerial vehicle to visit multiple radio station locations based on a schedule.

15. The non-transitory computer readable storage medium of claim 14, wherein the schedule includes a condition based on available power of the unmanned aerial vehicle.

16. The non-transitory computer readable storage medium of claim 13, wherein the instructions, when executed, cause the unmanned aerial vehicle to perform a troubleshooting operation associated with the at least one radio station in response to identification by the unmanned aerial vehicle of a watermark error in accessed radio broadcast.

17. The non-transitory computer readable storage medium of claim 13, wherein the instructions, when executed, cause the unmanned aerial vehicle to park until deployment to the at least one radio station is initiated, the deployment to the station based on a Global Positioning System auto-pilot flight path.

* * * * *